(12) United States Patent (10) Patent No.: US 12,693,719 B2
Baek et al. (45) Date of Patent: Jul. 28, 2026

(54) STORAGE DEVICE AND ELECTRONIC DEVICE

(71) Applicant: SK hynix Inc., Icheon-si (KR)

(72) Inventors: Seung Yeob Baek, Icheon-si (KR); Nam Hyeon Choi, Icheon-si (KR); Jun Heum Bae, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 251 days.

(21) Appl. No.: 18/504,779

(22) Filed: Nov. 8, 2023

(65) Prior Publication Data

US 2024/0419227 A1 Dec. 19, 2024

(30) Foreign Application Priority Data

Jun. 13, 2023 (KR) ........................ 10-2023-0075595

(51) Int. Cl.
G06F 1/32 (2019.01)
G06F 1/20 (2006.01)
G06F 1/3234 (2019.01)

(52) U.S. Cl.
CPC ............ G06F 1/206 (2013.01); G06F 1/3275 (2013.01)

(58) Field of Classification Search
CPC .............................. G06F 1/206; G06F 1/3275
See application file for complete search history.

(56) References Cited

U.S. PATENT DOCUMENTS

| | | | |
|---|---|---|---|
| 10,559,342 B2 * | 2/2020 | Fujioka | ............. G11C 11/40615 |
| 10,989,798 B2 * | 4/2021 | Imai | ........................ G06F 1/3206 |
| 11,017,823 B1 | 5/2021 | Kamepalli et al. | |
| 2024/0311010 A1 * | 9/2024 | Fujimoto | ............. G06F 3/0634 |

FOREIGN PATENT DOCUMENTS

KR 10-2011-0041570 A 4/2011

* cited by examiner

*Primary Examiner* — Zahid Choudhury

(57) ABSTRACT

In an embodiment of the disclosed technology, a heat generation control equation used when changing a power mode for heat generation control of a component included in an electronic device such as a storage device is used by being set differently for each power mode. Therefore, heat generation control that accurately reflects the relationship between a change in temperature of the component in each power mode and a temperature value obtained through a temperature sensor may be performed. Accordingly, performance degradation due to unnecessary heat generation control may be prevented by efficient heat generation control, and operational performance of the storage device may be improved.

15 Claims, 11 Drawing Sheets

| Power mode | Tread1 | Tcom1 | Tmem | Gap (Tmem − Tread1) |
|---|---|---|---|---|
| PM1 | 76 | 79 | 79 | 3 |
| PM1 | 78 | 81 | 81 | 3 |

| Section | Temp Range | Equation |
|---|---|---|
| 1 | For all X | Tcom = X + 3 |

\* X : Temperature value (Tread1) read in first power mode (PM1)

| Power mode | Tread2 | Tcom2 | Tmem | Gap (Tmem − Tread2) |
|---|---|---|---|---|
| PM2 | 74 | 79 | 79 | 5 |
| PM2 | 76 | 81 | 81 | 5 |
| PM2 | 78 | 83 | 83 | 5 |
| PM2 | 80 | 85 | 85 | 5 |

| Section | Temp Range | Equation |
|---|---|---|
| 1 | For all Y | Tcom = Y + 5 |

\* Y : Temperature value (Tread2) read in second power mode (PM2)

| Power mode | Tread2 | Tcom2 | Tmem | Gap (Tmem − Tread2) |
|---|---|---|---|---|
| PM2 | 74 | 79 | 79 | 5 |
| PM2 | 76 | 81 | 81 | 5 |
| PM2 | 78 | 83 | 83 | 5 |
| PM2 | 80 | 85 | 85 | 5 |

| Section | Temp Range | Equation |
|---|---|---|
| 1 | For all Y | Tcom = Y + 5 |

*Y : Temperature value (Tread2) read in second power mode (PM2)*

| Power mode | Tread3 | Tcom3 | Tmem | Gap (Tmem − Tread3) |
|---|---|---|---|---|
| PM3 | 72 | 79 | 79 | 7 |
| PM3 | 74 | 81 | 81 | 7 |
| PM3 | 76 | 83 | 83 | 7 |
| PM3 | 78 | 85 | 85 | 7 |
| PM3 | 80 | 87 | 87 | 7 |
| PM3 | 82 | 89 | 89 | 7 |

| Section | Temp Range | Equation |
|---|---|---|
| 1 | For all Z | Tcom = Z + 7 |

*Z : Temperature value (Tread3) read in third power mode (PM3)*

Throttling

Performance [MB/s]

Temperature[°C]

Elapsed time[sec]

·—· Temp    —— Performance

<EX 1>

<EX 2>

| Power mode | Tread1 | Tcom1 | Tcase | Gap (Tcase − Tread1) |
|---|---|---|---|---|
| PM1 | 66 | 41 | 41 | -25 |
| PM1 | 69 | 44 | 44 | -25 |
| PM1 | 73 | 48 | 48 | -25 |

| Section | Temp Range | Equation |
|---|---|---|
| 1 | For all X | Tcom = X - 25 |

\* X : Temperature value (Tread1) read in first power mode (PM1)

| Power mode | Tread2 | Tcom2 | Tcase | Gap (Tcase − Tread2) |
|---|---|---|---|---|
| PM2 | 66 | 48 | 48 | -18 |
| PM2 | 69 | 51 | 51 | -18 |

| Section | Temp Range | Equation |
|---|---|---|
| 1 | For all Y | Tcom = Y - 18 |

\* Y : Temperature value (Tread2) read in second power mode (PM2)

| Power mode | Tread2 | Tcom2 | Tcase | Gap (Tcase – Tread2) |
|---|---|---|---|---|
| PM2 | 66 | 48 | 48 | -18 |
| PM2 | 69 | 51 | 51 | −18 |

| Section | Temp Range | Equation |
|---|---|---|
| 1 | For all Y | Tcom = Y - 18 |

\* Y : Temperature value (Tread2) read in second power mode (PM2)

| Power mode | Tread3 | Tcom3 | Tmem | Gap (Tmem – Tread3) |
|---|---|---|---|---|
| PM3 | 71 | 74 | 74 | 3 |
| PM3 | 73 | 76 | 76 | 3 |

| Section | Temp Range | Equation |
|---|---|---|
| 1 | For all Z | Tcom = Z + 3 |

\* Z : Temperature value (Tread3) read in third power mode (PM3)

FIG.7

Driving Mode 1

| Power mode | Tread1 | Tcom1 | Tmem | Gap (Tmem – Tread1) | Drive Throttling | System Cooling |
|---|---|---|---|---|---|---|
| PM1 | 83 | 80 | 83 | 0 | | |
| PM1 | 86 | 83 | 86 | 0 | | |
| PM1 | 89 | 86 | 89 | 0 | | |

| Section | Temp Range | Equation |
|---|---|---|
| 1 | For all X | Tcom = X - 3 |

Driving Mode 2

| Power mode | Tread1 | Tcom1 | Tmem | Gap (Tmem – Tread1) | Drive Throttling | System Cooling |
|---|---|---|---|---|---|---|
| PM1 | 80 | 80 | 80 | 0 | | |
| PM1 | 83 | 83 | 83 | 0 | | |
| PM1 | 86 | 86 | 86 | 0 | | |

| Section | Temp Range | Equation |
|---|---|---|
| 1 | For all X | Tcom = X |

Driving Mode 3

| Power mode | Tread1 | Tcom1 | Tmem | Gap (Tmem – Tread1) | Drive Throttling | System Cooling |
|---|---|---|---|---|---|---|
| PM1 | 77 | 80 | 77 | 0 | | |
| PM1 | 80 | 83 | 80 | 0 | | |
| PM1 | 83 | 86 | 83 | 0 | | |

| Section | Temp Range | Equation |
|---|---|---|
| 1 | For all X | Tcom = X + 3 |

\* X : Temperature value (Tread1) read in first power mode (PM1)

STORAGE DEVICE AND ELECTRONIC DEVICE

CROSS-REFERENCE TO RELATED APPLICATION

The present application claims priority under 35 U.S.C. § 119 (a) to Korean Patent Application No. 10-2023-0075595 filed in the Korean Intellectual Property Office on Jun. 13, 2023, which is incorporated herein by reference in its entirety.

BACKGROUND

1. Technical Field

Various embodiments of the disclosed technology generally relate to a storage device and an electronic device.

2. Related Art

A storage device may include at least one memory which stores data. The storage device may include a controller which controls an operation of writing or erasing data to or in the memory or reading data from the memory.

Also, the storage device may include at least one electronic component in addition to the memory and the controller.

As the storage device includes various components, heat may be generated while operating the storage device. This heat generation can lead to performance degradation of the storage device due to the impact on the components in the storage device.

SUMMARY

Various embodiments of the present disclosure are directed to providing measures capable of efficiently controlling heat generation while operating an electronic component, such as a memory or a controller, included in a storage device.

In an embodiment, a storage device may include: at least one memory; at least one external memory temperature sensor positioned adjacent to the at least one memory; and a controller configured to calculate a first estimated value using a first temperature value obtained from the at least one external memory temperature sensor while the at least one memory is driven in a first power mode and a default heat generation control equation, change the first power mode to a second power mode when the first estimated value is equal to or greater than a first threshold value, and perform heat generation control using a first changed heat generation control equation different from the default heat generation control equation while the at least one memory is driven in the second power mode.

In an embodiment, a storage device may include: at least one memory; at least one external memory temperature sensor positioned adjacent to the at least one memory; and a controller configured to control a power mode in which the at least one memory is driven, on the basis of a temperature value obtained from the at least one external memory temperature sensor and a preset threshold value, wherein a difference between a first temperature value obtained from the at least one external memory temperature sensor and a preset first threshold value when a first power mode is changed to a second power mode is different from a difference between a second temperature value obtained from the at least one external memory temperature sensor and a preset second threshold value when the second power mode is changed to a third power mode.

In an embodiment, an electronic device may include: a plurality of electronic components disposed on a substrate; a plurality of external temperature sensors positioned outside the plurality of electronic components, respectively, and disposed adjacent to the plurality of electronic components, respectively; and a controller configured to control a power mode in which at least a part of the plurality of electronic components is driven, using temperature values obtained from the plurality of external temperature sensors and a preset heat generation control equation, the heat generation control equation being set differently for each power mode.

According to the embodiments of the disclosed technology, heat generation during the operation of a component included in a storage device may be efficiently controlled to prevent performance degradation of the storage device and improve operational performance of the storage device.

BRIEF DESCRIPTION OF THE DRAWINGS

FIG. 7 illustrates a scheme in which the storage device performs heat generation control according to still another embodiment of the disclosed technology.

DETAILED DESCRIPTION

Figure 1:
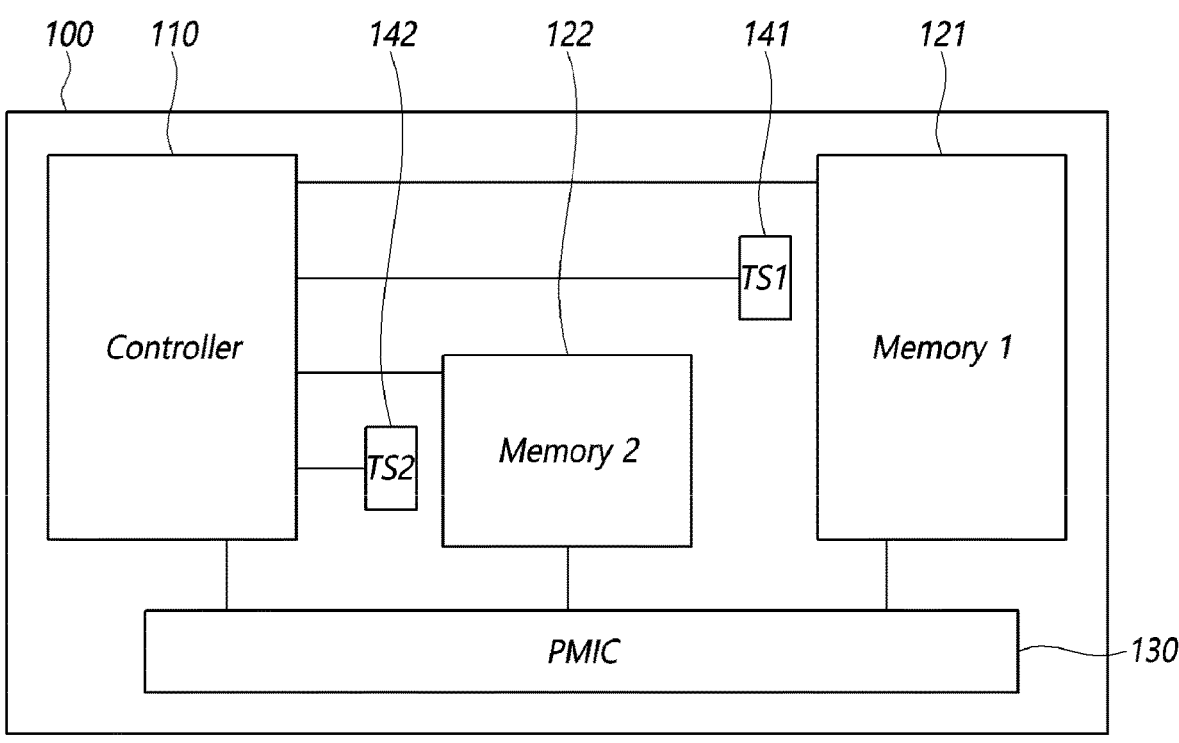
FIG. 1 illustrates a storage device according to an embodiment of the disclosed technology.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Hereinafter, various embodiments of the present disclosure will be described in detail with reference to accompanying drawings.

FIG. 1 illustrates a storage device 100 according to an embodiment of the disclosed technology.

Referring to FIG. 1, the storage device 100 may include at least one memory and a controller 110 which controls the operation of the at least one memory. The storage device 100 may further include a power management integrated circuit (PMIC) 130 which supplies power to the memory and the controller 110.

The storage device 100 may further include at least one temperature sensor. As the case may be, the storage device 100 may further include at least one electronic component in addition to the above-described components.

The above-described memory, controller 110, and temperature sensor may be mounted on a substrate such as a printed circuit board. The storage device 100 may further include a case that accommodates the above-described components mounted on the substrate.

The storage device 100 may include a first memory 121. The first memory 121 may be a nonvolatile memory. The storage device 100 may include one or more first memories 121.

For example, the first memory 121 may be implemented into any of various types such as a NAND flash memory, a 3D NAND flash memory, a NOR flash memory, a resistive random access memory, a phase-change random access memory, a magnetoresistive random access memory, a ferroelectric random access memory, and a spin transfer torque random access memory. The first memory 121 may be implemented to have a three-dimensional array structure. The embodiment of the disclosed technology may be applied to both a flash memory, where a charge storage layer is configured by a floating gate, and a charge trap flash (CTF), where a charge storage layer is configured by an insulating film.

The first memory 121 may include a plurality of memory blocks, and may operate under the control of the controller 110. Operations of the first memory 121 may include a program operation (also referred to as a "write operation"), an erase operation, and a read operation.

The first memory 121 may include a memory cell array including a plurality of memory cells which store data. The memory cell array may exist in a memory block.

The controller 110 may control program, erase, read, and background operations of the first memory 121. The background operation may include at least one among garbage collection, wear leveling, read reclaim, and bad block management.

The controller 110 may control the operation of the first memory 121 according to a request from a device (e.g., a host) located outside the storage device 100. Also, the controller 110 may control the operation of the first memory 121 regardless of a request from the host.

For example, the host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a telematics network, an RFID (radio frequency identification) device, a mobility device (e.g., a vehicle, a robot or a drone) capable of driving under human control or autonomous driving, etc. Alternatively, the host may be a virtual/augmented reality device which provides a 2D or 3D virtual reality image or augmented reality image. Besides, the host may be any one of various electronic devices which require the storage device 100 capable of storing data.

The host may include at least one operating system. The operating system may generally manage and control the function and operation of the host, and may provide interoperability between the host and the storage device 100. The operating system may be classified into a general operating system and a mobile operating system depending on the mobility of the host.

The controller 110 and the host may be devices which are separated from each other. As the case may be, the controller 110 and the host may be realized by being integrated into one device. Hereunder, for the sake of convenience in explanation, it will be described as an example that the controller 110 and the host are devices which are separated from each other.

The controller 110 may include a host interface which provides an interface for communication with the host. The controller 110 may include a memory interface which provides an interface for communication with the first memory 121.

For instance, the controller 110 may include at least one of a processor, a working memory, and so forth, and may optionally include an error detection and correction circuit.

The processor may control the general operations of the controller 110, and may perform a logical operation. The processor may communicate with the host through the host interface, and may communicate with the first memory 121 through the memory interface.

The processor may perform the function of a flash translation layer (FTL). The processor may translate a logical block address provided by the host into a physical block address using the flash translation layer. The flash translation layer may receive a logical block address and translate the logical block address into a physical block address using a mapping table.

The processor may execute firmware to control the operation of the controller 110. In order to control general operations of the controller 110 and perform a logical operation, the processor may execute (or drive) firmware loaded in the working memory upon booting. An operation of the storage device 100 to be described in the embodiment of the disclosed technology may be implemented in such a way that the processor executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one among a flash translation layer (FTL) which performs a translating function between a logical address requested to the storage device 100 from the host and a physical address of the first memory 121, a host interface layer (HIL) which serves to interpret a command requested to the storage device 100 from the host and transfer the command to the flash translation layer (FTL), and a flash interface layer (FIL) which transfers a command, instructed from the flash translation layer (FTL), to the first memory 121.

For example, the firmware may be loaded into the working memory from the first memory 121 or a separate nonvolatile memory (e.g., a ROM or a NOR Flash) located outside the first memory 121. The processor may first load all or a part of the firmware in the working memory when executing a booting operation after power-on.

The processor may perform a logical operation which is defined in the firmware loaded in the working memory, to control the general operations of the controller 110. The processor may store a result of performing the logical operation defined in the firmware, in the working memory. The processor may control the controller 110 to generate a command or a signal, according to a result of performing the logical operation defined in the firmware. When a part of firmware in which a logical operation to be performed is defined is not loaded in the working memory, the processor may generate an event (e.g., an interrupt) for loading the corresponding part of the firmware in the working memory.

The working memory may store firmware, a program code, a command, and data which are necessary to drive the controller 110. Such a working memory as, for example, a volatile memory, may include at least one among an SRAM (static RAM), a DRAM (dynamic RAM), and an SDRAM (synchronous DRAM).

The working memory may be located inside or outside the controller 110. As the case may be, working memories may be located inside and outside the controller 110.

The storage device 100 may further include a second memory 122 which is located outside the controller 110. The second memory 122 may be a volatile memory, and may perform the function of the above-described working memory. The storage device 100 may include one or more second memories 122.

When a memory such as the first memory 121 and/or the second memory 122 included in the storage device 100 is driven, performance degradation may occur due to heat generated according to the driving of the memory. The embodiment of the disclosed technology may provide measures for the controller 110 to be capable of controlling the heat generation, thereby preventing or reducing performance degradation of the storage device 100.

The storage device 100 may include at least one temperature sensor which is positioned adjacent to the memory.

The storage device 100 may include a first temperature sensor (TS1) 141 which is positioned adjacent to the first memory 121. The storage device 100 may further include a second temperature sensor (TS2) 142 which is positioned adjacent to the second memory 122.

In the present specification, the first temperature sensor 141 and the second temperature sensor 142 may be referred to as "external memory temperature sensors."

The first temperature sensor 141 may not be directly connected to the first memory 121. The second temperature sensor 142 may not be directly connected to the second memory 122. As the case may be, each of the first temperature sensor 141 and the second temperature sensor 142 may be connected to each of the first memory 121 and the second memory 122 through a metal wiring or the like.

The first temperature sensor 141 and the second temperature sensor 142 may be electrically connected to the controller 110.

Temperature values measured by the first temperature sensor 141 and the second temperature sensor 142 may be provided to the controller 110. The controller 110 may control heat generation of the storage device 100 based on the temperature values provided by the first temperature sensor 141 and the second temperature sensor 142.

For example, the controller 110 may compare a temperature value received from at least one of the first temperature sensor 141 or the second temperature sensor 142 with a threshold value, and may change a power mode of the storage device 100 or the memory based on the comparison result.

When the power mode of the storage device 100 or the memory is changed, power consumption set to drive the storage device 100 or the memory may be changed. The power consumption set to drive the storage device 100 or the memory may be referred to as "set power consumption."

For example, when the power mode is changed, the set power consumption may be reduced from 10 W to 5 W, and thus the magnitude of current flowing through the memory or the controller 110 included in the storage device 100 may be reduced.

As the magnitude of current flowing through the memory or the controller 110 is reduced, the temperature of the memory or the controller 110 included in the storage device 100 may decrease, or a rate at which the temperature rises may gradually decrease over time.

Since the controller 110 controls the power mode based on a temperature value obtained from a temperature sensor, performance degradation due to heat generation of a component included in the storage device 100 may be prevented or reduced, and performance of the storage device 100 may be improved.

In addition, in the embodiment of the disclosed technology, by controlling the heat generation while considering the fact that the temperature change characteristic of a component included in the storage device 100 varies with changes in the power mode, it is possible to provide measures that enhance the performance of the heat generation control function of the storage device 100.

Figure 2:
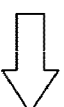
FIGS. 2 and 3 illustrate a scheme in which the storage device performs heat generation control according to an embodiment of the disclosed technology.
Figure 3:
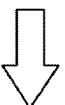
Figure 4A:
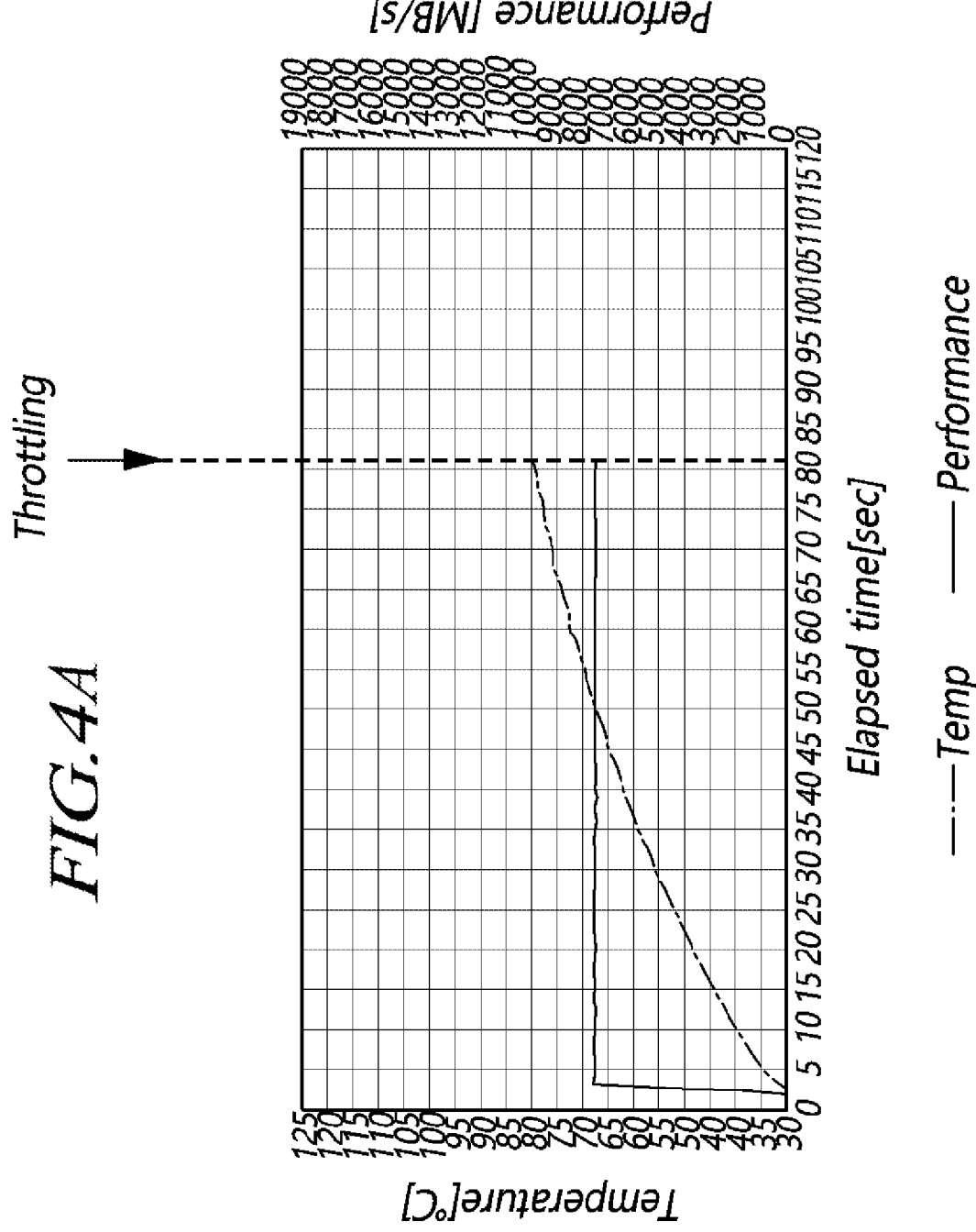
FIGS. 4A and 4B illustrate a change in performance of the storage device when heat generation control is performed according to the scheme illustrated in FIGS. 2 and 3.
Figure 4B:
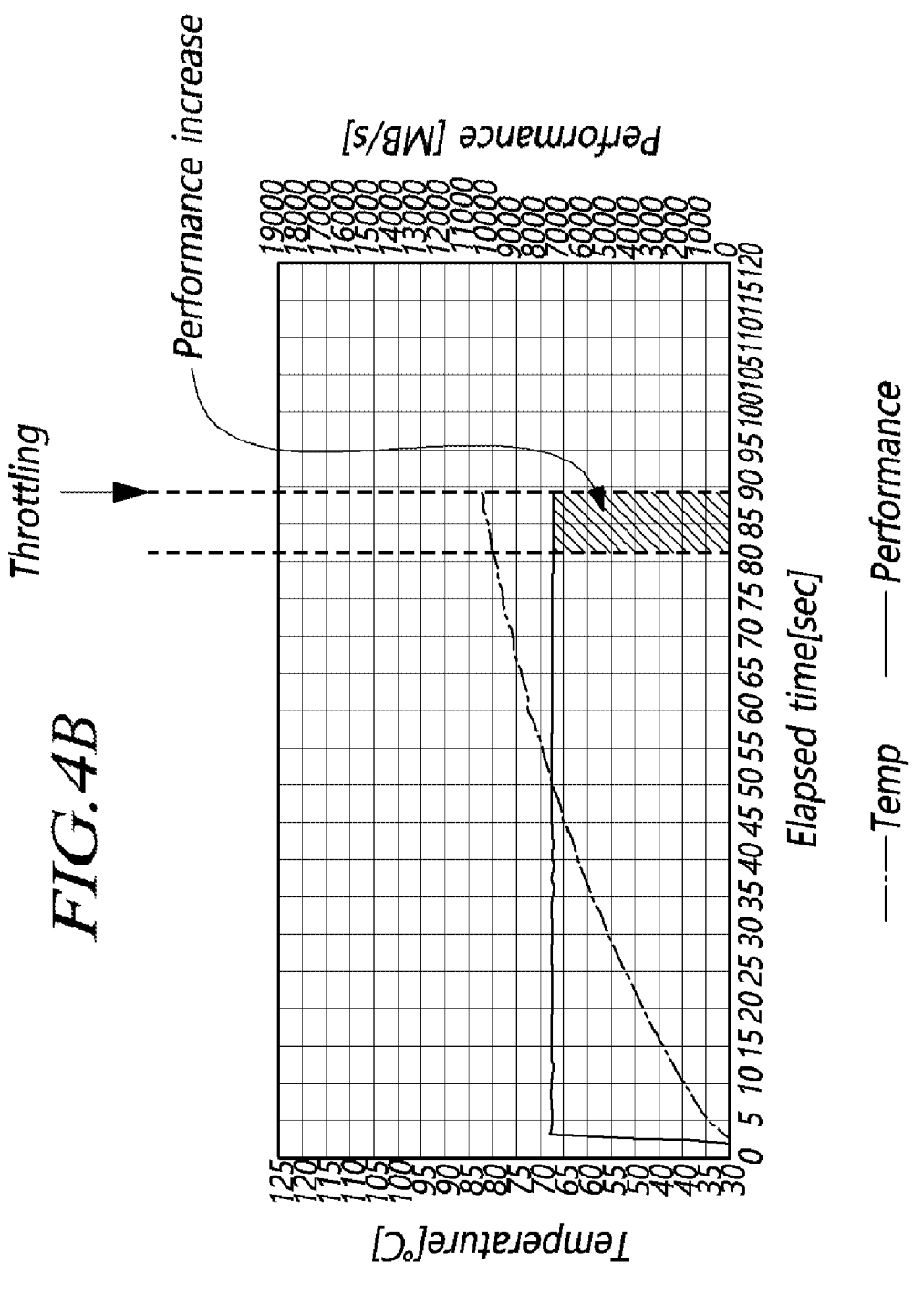

FIGS. 2 and 3 illustrate a scheme in which the storage device 100 of FIG. 1 performs heat generation control according to an embodiment of the disclosed technology. FIGS. 4A and 4B show a change in performance of the storage device 100 when the heat generation control is performed according to the scheme illustrated in FIGS. 2 and 3.

Referring to FIGS. 2 and 3, the storage device 100 may operate according to a power mode that is set as a default power mode upon booting. For example, the storage device 100 may operate according to a first power mode PM1 that is set as the default power mode.

The fact that the storage device 100 operates according to the first power mode PM1 may mean that at least one component included in the storage device 100 operates in the first power mode PM1.

For example, the first memory 121 included in the storage device 100 may operate according to the first power mode PM1. Also, the second memory 122 included in the storage device 100 may operate according to the first power mode PM1. As the case may be, a circuit component such as the controller 110 and the power management integrated circuit 130 included in the storage device 100 may operate according to the first power mode PM1.

A temperature sensor included in the storage device 100 may provide a temperature value obtained while the storage device 100 is driven according to the first power mode PM1, to the controller 110.

For example, the first temperature sensor 141 may provide a temperature value obtained while the storage device 100 is driven in the first power mode PM1, to the controller 110. The controller 110 may read the temperature value from the first temperature sensor 141 periodically or at a preset time point.

Also, the second temperature sensor 142 may provide a temperature value obtained while the storage device 100 is driven in the first power mode PM1, to the controller 110. The controller 110 may read the temperature value from the second temperature sensor 142 periodically or at a preset time point.

The controller 110 may control the power mode of the storage device 100 using at least one of the temperature values provided from the first temperature sensor 141 and the second temperature sensor 142.

The controller 110 may perform heat generation control based on the temperature value provided from the first temperature sensor 141, or may perform the heat generation control based on the temperature value provided from the second temperature sensor 142. As the case may be, the controller 110 may perform the heat generation control using the temperature values provided from the first temperature sensor 141 and the second temperature sensor 142 in a combined manner, or it may be based on a temperature value having a larger risk due to heat generation between the two temperature values.

For the sake of convenience in explanation, FIG. 2 shows heat generation control based on a temperature value provided from the first temperature sensor 141, but the embodiment of the disclosed technology may be applied to heat generation control performed using temperature values provided from at least one of the first temperature sensor 141 or the second temperature sensor 142 as described above.

The controller 110 may read the temperature value from the first temperature sensor 141 while the storage device 100 is driven according to the first power mode PM1.

The controller 110 may calculate an estimated value using the temperature value read from the first temperature sensor 141 and a preset heat generation control equation.

For example, the controller 110 may calculate a first estimated value Tcom1 using a first temperature value Tread1 read from the first temperature sensor 141 and a preset default heat generation control equation.

The default heat generation control equation may be an equation that calculates an estimated value Tcom (e.g., Tcom1) by adding 3 to a temperature value X (e.g., Tread1) obtained from the first temperature sensor 141.

When the first temperature value Tread1 read from the first temperature sensor 141 in the first power mode PM1 is 76 (unit: ° C.), the first estimated value Tcom1 may be 79. When the first temperature value Tread1 is 78, the first estimated value Tcom1 may be 81. In respective cases, actual temperature values Tmem of the first memory 121 may be 79 and 81. A difference between the first temperature value Tread1 and the actual temperature value Tmem of the first memory 121 may be 3.

The controller 110 may compare the first estimated value Tcom1 calculated using the first temperature value Tread1 with a first threshold value. The first threshold value may be a value that is set for the first power mode PM1. In the example shown in FIG. 2, the first threshold value may be 81 as an example.

For example, when the first estimated value Tcom1 is equal to or greater than the first threshold value, the controller 110 may change the power mode of the storage device 100 from the first power mode PM1 to a second power mode PM2. The second power mode PM2 may be a mode in which its set power consumption is lower than that of the first power mode PM1. For example, when the set power consumption of the first power mode PM1 is 10 W, the set power consumption of the second power mode PM2 may be 5 W.

When the first temperature value Tread1 read from the first temperature sensor 141 is 76, since the first estimated value Tcom1 is 79 and thus it is smaller than 81 that is the first threshold value, the controller 110 may maintain the first power mode PM1. On the other hand, when the first temperature value Tread1 read from the first temperature sensor 141 is 78, since the first estimated value Tcom1 is 81 and thus it is equal to 81 that is the first threshold value, the controller 110 may change the first power mode PM1 to the second power mode PM2.

The controller 110 may read a temperature value from the first temperature sensor 141 while the storage device 100 is driven according to the second power mode PM2.

The controller 110 may calculate an estimated value using the temperature value read from the first temperature sensor 141 and a preset heat generation control equation in the second power mode PM2.

The heat generation control equation used by the controller 110 in the second power mode PM2 may be different from the heat generation control equation used in the first power mode PM1.

For example, in the second power mode PM2, the controller 110 may calculate a second estimated value Tcom2 using a second temperature value Tread2 read from the first temperature sensor 141 and a first changed heat generation control equation that is preset.

The first changed heat generation control equation may be an equation that calculates an estimated value Tcom (e.g., Tcom2) by adding 5 to a temperature value Y (e.g., Tread2) obtained from the first temperature sensor 141.

When second temperature values Tread2 read from the first temperature sensor 141 in the second power mode PM2 are 74, 76, 78 and 80, second estimated values Tcom2 may be 79, 81, 83 and 85, respectively. In respective cases, actual temperature values Tmem of the first memory 121 may be 79, 81, 83 and 85. A difference between the second temperature value Tread2 and the actual temperature value Tmem of the first memory 121 may be 5.

In the second power mode PM2, the controller 110 may compare the second estimated value Tcom2 calculated using the second temperature value Tread2 with a second threshold value. The second threshold value may be a value that is set for the second power mode PM2. In the example shown in FIG. 2, the second threshold value may be 85 as an example.

When the second estimated value Tcom2 is smaller than the second threshold value, the controller 110 may maintain the second power mode PM2. When the second estimated value Tcom2 is equal to or greater than the second threshold value, the controller 110 may change the second power mode PM2 to a third power mode PM3.

Since the first changed heat generation control equation is different from the default heat generation control equation, a difference (or gap) between the second temperature value Tread2 and the second threshold value when the second power mode PM2 is changed to the third power mode PM3 may be different from a difference (or gap) between the first temperature value Tread1 and the first threshold value when the first power mode PM1 is changed to the second power mode PM2.

In the above example, a difference, e.g., 3, between the first temperature value Tread1 and the first threshold value when the first power mode PM1 is changed to the second power mode PM2 may be smaller than a difference, e.g., 5, between the second temperature value Tread2 and the second threshold value when the second power mode PM2 is changed to the third power mode PM3.

Since whether to change the power mode is controlled by using different heat generation control equations in respective power modes, the relationship between a temperature value and a threshold value, serving as a reference, and the heat generation state of the storage device 100 may be different when the first power mode PM1 is changed to the second power mode PM2 compared to when the second power mode PM2 is changed to the third power mode PM3.

The third power mode PM3 may be a mode in which set power consumption is lower than that of the second power mode PM2. For example, when the set power consumption of the second power mode PM2 is 5 W, the set consumption of the third power mode PM3 may be 1 W.

When the second estimated value Tcom2 is smaller than the first threshold value, the controller 110 may change the second power mode PM2 to the first power mode PM1.

Alternatively, the controller 110 may calculate a separate estimated value using the second temperature value Tread2 and the default heat generation control equation. The controller 110 may determine whether to change the second power mode PM2 to the first power mode PM1 based on a result of comparing the separate estimated value and the first threshold value.

The controller 110 may calculate an estimated value using a temperature value Tread3 read from the first temperature sensor 141 and a preset heat generation control equation while the storage device 100 is driven according to the third power mode PM3. The controller 110 may control the power mode using the estimated value and a preset threshold value.

The heat generation control equation used by the controller 110 in the third power mode PM3 may be different from the heat generation control equations used in the first power mode PM1 and the second power mode PM2.

For example, in the third power mode PM3, the controller 110 may calculate an estimated value using a second changed heat generation control equation that is different from the default heat generation control equation and the first changed heat generation control equation.

The second changed heat generation control equation may be an equation that calculates an estimated value Tcom (e.g., Tcom3) by adding 7 to a temperature value Z (e.g., Tread3) obtained from the first temperature sensor 141.

When third temperature values Tread3 obtained from the first temperature sensor 141 in the third power mode PM3 are 72, 74, 76, 78, 80 and 82, third estimated values Tcom3 may be 79, 81, 83, 85, 87 and 89, respectively. In respective cases, actual temperature values Tmem of the first memory 121 may be 79, 81, 83, 85, 87 and 89. A difference (or gap) between the third temperature value Tread3 and the actual temperature value Tmem of the first memory 121 may be 7.

In this way, since whether to change the power mode according to a change in temperature is determined using a heat generation control equation that is set differently according to each power mode, unnecessary heat generation control in each power mode is prevented or reduced, and operational performance of the storage device 100 may be improved.

For example, if a heat generation control equation used in the first power mode PM1 is the same as that used in the second power mode PM2, when the first temperature value Tread1 obtained in the first power mode PM1 is 76, the first estimated value Tcom1 may be 81 that is obtained by adding 5 to 76. In this case, since the first estimated value Tcom1 is equal to the first threshold value of 81, the controller 110 may change the first power mode PM1 to the second power mode PM2. Therefore, despite the actual temperature value Tmem of the first memory 121 being 79 that is smaller than the first threshold value of 81, the first power mode PM1 may be changed to the second power mode PM2, and thus operational performance of the storage device 100 may degrade.

On the other hand, according to the embodiment of the disclosed technology, since a heat generation control equation used in the first power mode PM1 is set differently from that used in the second power mode PM2, when the first temperature value Tread1 is 78, the first estimated value Tcom1 may be 81. At a time point when the first temperature value Tread1 is 78, the first power mode PM1 may be changed to the second power mode PM2. Therefore, while the actual temperature value Tmem of the first memory 121 changes from 79 to 81, the storage device 100 may be driven according to the first power mode PM1.

For example, when the same heat generation control equation is applied to the above different power modes, a time point at which throttling is entered due to heat generation may be faster, as shown in <EX 1> of FIG. 4A. When throttling is entered, the power mode may be changed, and various controls that degrade the operational performance of the storage device 100 to reduce heat generation may be performed.

On the other hand, when different heat generation control equations are applied to the above different power modes, a time point at which throttling is entered due to heat generation may be delayed, as shown in <EX 2> of FIG. 4B.

Since a heat generation control equation is set based on an actual temperature change and a temperature value of the first memory 121 that is targeted for heat generation control, damage or malfunction of the first memory 121 may be prevented. In addition, the operational performance of the first memory 121 may be improved as the time point at which throttling is entered is delayed.

Unnecessary performance degradation due to a change in power mode for controlling heat generation of the storage device 100 may be prevented or reduced. Heat generation control that reflects characteristics with different temperature change degrees according to a change in power mode of the storage device 100 may be performed.

The foregoing examples may also be applied to a scheme of controlling heat generation of the second memory 122 based on a temperature value obtained using the second temperature sensor 142. In addition, the foregoing examples may also be applied to a scheme of controlling heat generation of the first memory 121 and the second memory 122 based on temperature values obtained using the first temperature sensor 141 and the second temperature sensor 142.

Moreover, in an embodiment of the disclosed technology, heat generation control of the storage device 100 may be performed by changing a heat generation target to be compared with a temperature value obtained through a single temperature sensor, depending on a power mode.

Figure 5:
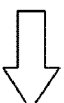
FIGS. 5 and 6 illustrate a scheme in which the storage device performs heat generation control according to another embodiment of the disclosed technology.
Figure 6:
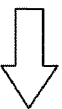

FIGS. 5 and 6 illustrate a scheme in which the storage device 100 of FIG. 1 performs heat generation control according to another embodiment of the disclosed technology.

Referring to FIGS. 5 and 6, the storage device 100 may perform heat generation control using a temperature value that is obtained through the first temperature sensor 141. The controller 110 included in the storage device 100 may perform the heat generation control using a heat generation control equation that is set differently according to each power mode.

The heat generation control equation that is set differently according to each power mode may be set based on a temperature value of a heat generation target, which is set differently in each power mode.

For example, heat generation control equations used in the first power mode PM1 and the second power mode PM2 may be set based on a temperature value and temperature change of a case included in the storage device 100. The heat generation control equations may be set such that the power mode is changed based on the temperature value and temperature change of the case.

Referring to the example shown in FIG. 5, a default heat generation control equation used in the first power mode PM1 may be an equation that calculates an estimated value Tcom by subtracting 25 from a temperature value X obtained through the first temperature sensor 141.

When first temperature values Tread1 obtained through the first temperature sensor 141 are 66, 69 and 73, first estimated values Tcom1 corresponding to them may be 41, 44 and 48, respectively. In respective cases, actual temperature values Tcase of the case may be 41, 44 and 48. A difference (or gap) between the first temperature value Tread1 and the actual temperature value Tcase of the case may be 25.

The controller 110 may compare the first estimated value Tcom1 with a preset first threshold value. The first threshold value may be 48. When the first estimated value Tcom1 is equal to or greater than the first threshold value, the controller 110 may change the first power mode PM1 to the second power mode PM2.

In the second power mode PM2, the controller 110 may perform the heat generation control using a first changed heat generation control equation that is different from the default heat generation control equation used in the first power mode PM1.

The first changed heat generation control equation may be an equation that calculates an estimated value Tcom (e.g., Tcom2) by subtracting 18 from a temperature value Y (e.g., Tread2) obtained through the first temperature sensor 141.

When second temperature values Tread2 obtained through the first temperature sensor 141 are 66 and 69, second estimated values Tcom2 corresponding to them may be 48 and 51, respectively. In respective cases, actual temperature values Tcase of the case may be 48 and 51. A difference (or gap) between the second temperature value Tread2 and the actual temperature value Tcase of the case may be 18.

When the second estimated value Tcom2 is equal to or greater than a second threshold value, the controller 110 may change the second power mode PM2 to the third power mode PM3. The second threshold value may be 51. When the second estimated value Tcom2 is equal to or greater than 51, which is the second threshold value, the controller 110 may change the second power mode PM2 to the third power mode PM3.

Since the change of the power mode is controlled using heat generation control equations that are set differently in the first power mode PM1 and the second power mode PM2, a time point at which the first power mode PM1 is changed to the second power mode PM2 may be delayed within a range of preventing damage or malfunction of the storage device 100 due to heat generation in the first power mode PM1. Operational performance of the storage device 100 may be improved while effectively controlling the heat generation of the storage device 100.

When the power mode is changed from the second power mode PM2 to the third power mode PM3, the controller 110 may perform the heat generation control using a heat generation control equation that is different from the heat generation control equations used in the first power mode PM1 and the second power mode PM2.

For example, in the third power mode PM3, the controller 110 may perform the heat generation control using a second changed heat generation control equation that is different from the default heat generation control equation and the first changed heat generation control equation.

The second changed heat generation control equation may be an equation that calculates an estimated value Tcom by adding 3 to a temperature value Z (e.g., Tread3) obtained through the first temperature sensor 141 in the third power mode PM3. The second changed heat generation control equation may be an equation that is set based on the relationship between a temperature value Tread3 obtained through the first temperature sensor 141 and an actual temperature value Tmem of the first memory 121.

When third temperature values Tread3 obtained through the first temperature sensor 141 are 71 and 73, third estimated values Tcom3 corresponding to them may be 74 and 76, respectively. In respective cases, actual temperature values Tmem of the first memory 121 may be 74 and 76. A difference (or gap) between the third temperature value Tread3 and the actual temperature value Tmem of the first memory 121 may be 3.

When the power mode is changed from the first power mode PM1 or the second power mode PM2, a temperature value obtained through the first temperature sensor 141 may be greater than a threshold value. For example, a first temperature value is greater than the threshold value when the first power mode PM1 is changed to the second power mode PM2 or when the second power mode PM2 is changed to the third power mode PM3. When the power mode (or heat generation control mode) is changed from the third power mode PM3, a temperature value obtained through the first temperature sensor 141 may be smaller than a threshold value. For example, the first temperature value is smaller than the threshold value when the third power mode PM3 is changed to the other power mode.

When the risk of damage or malfunction of the storage device 100 due to heat generation is not high, as in the first power mode PM1 or the second power mode PM2, the heat generation control may be performed using a heat generation control equation that is easily set based on a temperature of the case, which is separated from the first temperature sensor 141 by at least a predetermined distance.

However, in a power mode such as the third power mode PM3, which represents a state in which the degree of heat generation is high, the heat generation control may be performed using a heat generation control equation that is set based on a change in the temperature of the first memory 121 positioned adjacent to the first temperature sensor 141.

Alternatively, in the first power mode PM1, the heat generation control equation that is set based on the temperature value and temperature change of the case may be used, and in each of the second power mode PM2 and the third power mode PM3, the heat generation control equation that is set based on a temperature value and temperature change of the first memory 121 may be used. In this case, when the power mode is changed from the second power mode PM2, a temperature value obtained through the first temperature sensor 141 may be smaller than a threshold value set in the second power mode PM2, and when the power mode is changed from the first power mode PM1, the temperature value obtained through the first temperature sensor 141 may be greater than a threshold value set in the first power mode PM1. A distance between a target serving as a reference for deriving a heat generation control equation used in the first power mode PM1 and the first temperature sensor 141 may be larger than a distance between a target serving as a reference for deriving a heat generation control equation used in the second power mode PM1 and the first temperature sensor 141. Therefore, an absolute value of a difference between a temperature value obtained through the first temperature sensor 141 and a threshold value when the power mode is changed from the first power mode PM1 may be greater than an absolute value of a difference between a temperature value obtained through the first temperature sensor 141 and a threshold value when the power mode is changed from the second power mode PM2.

In this way, the heat generation control is performed using a temperature value obtained through the same temperature sensor, and a heat generation control equation set differently for each power mode may be used. In the heat generation control equation set differently for each power mode, a target serving as a reference for setting the corresponding equation may be different for each power mode. Accordingly, the heat generation control may be performed by a heat generation control equation with increased accuracy depending on the risk of heat generation.

In an embodiment of the disclosed technology, heat generation control by a heat generation control equation set differently according to the driving mode of the storage device 100, even in the same power mode, may be performed.

FIG. 7 illustrates a scheme in which the storage device 100 of FIG. 1 performs heat generation control according to still another embodiment of the disclosed technology.

Referring to FIG. 7, the storage device 100 may be driven in at least two driving modes while operating in the first power mode PM1. For example, the storage device 100 may be driven in any one among a first driving mode, a second driving mode, and a third driving mode while operating in the first power mode PM1.

Operational performance of the storage device 100 may vary according to the driving mode. The first driving mode may be a high-performance mode in which the storage device 100 operates with high performance. The second driving mode may be a normal driving mode. The third driving mode may be a low-performance mode, such as an idle mode, in which the storage device 100 operates with low performance. In the normal driving mode, the storage device 100 operates with performance between the high performance and the low performance. For example, power consumptions set for the first driving mode, the second driving mode, and the third driving mode may be 10 W, 8 W, and 6 W, respectively.

In the case of the first driving mode, the storage device 100 operates with high performance and thus operates at a high speed within a short time. Therefore, even when a component included in the storage device 100, such as the first memory 121, operates at a high temperature, since the component is exposed to the high temperature for a short time, the risk of heat generation may be small.

On the other hand, since a component included in the storage device 100, such as the first memory 121, may operate for a relatively long time in the second driving mode or the third driving mode, it may be necessary to manage the storage device 100 to operate at a lower temperature.

Thus, while the storage device 100 operates in the first power mode PM1, the controller 110 may perform heat generation control using a heat generation control equation set differently according to the driving mode.

For example, the controller 110 may perform the heat generation control according to a first default heat generation control equation in the first driving mode. The first default heat generation control equation may be an equation that calculates an estimated value Tcom by subtracting 3 from a temperature value X obtained through the first temperature sensor 141.

The controller 110 may perform the heat generation control according to a second default heat generation control equation in the second driving mode. The second default heat generation control equation may be an equation that determines the temperature value X obtained through the first temperature sensor 141 as an estimated value Tcom.

The controller 110 may perform the heat generation control according to a third default heat generation control equation in the third driving mode. The third default heat generation control equation may be an equation that calculates an estimated value Tcom by adding 3 to the temperature value X obtained through the first temperature sensor 141.

Even though the same temperature value X is obtained through the first temperature sensor 141 in the first power mode PM1, an estimated value calculated from the same temperature value X may vary according to the driving mode.

For example, when first temperature values Tread1 obtained through the first temperature sensor 141 are 83, 86 and 89, first estimated values Tcom1 corresponding to them, which are calculated according to the first default heat generation control equation in the first driving mode, may be 80, 83 and 86, respectively. Therefore, when a threshold value for changing the power mode or entering throttling is 83, even if the first temperature value Tread1 is 83, the power mode may not be changed because the first estimated value Tcom1 is 80, which is smaller than the threshold value of 83. That is, even in a state in which the actual temperature value Tmem of the first memory 121 is 83, change of the power mode or the entering of throttling may not be made.

Meanwhile, when the first temperature value Tread1 is 86, the first estimated value Tcom1 is 83, and thus change of the power mode or the entering of throttling may be made. When throttling is entered, the actual temperature value Tmem of the first memory 121 may be 86.

When a threshold value serving as a reference for performing a cooling operation by the host is 86, in the case where the first temperature value Tread1 is 89, the cooling operation may be performed because the first estimated value Tcom1 is 86, which is equal to the threshold value of 86. When the cooling operation is performed, the actual temperature value Tmem of the first memory 121 may be 89.

In the first driving mode that is the high-performance mode, as throttling is entered when the actual temperature value Tmem of the first memory 121 is 86 and the cooling operation is performed when the actual temperature value Tmem of the first memory 121 is 89, a period during which the storage device 100 operates with high performance may increase.

In this way, the storage device 100 may operate longer in the high-performance mode. Since risk due to heat generation is low due to the operating characteristics of the high-performance mode, the driving performance of the storage device 100 may be increased while preventing damage or performance degradation of the storage device 100.

In the second driving mode that is the normal driving mode, when first temperature values Tread1 read from the first temperature sensor 141 are 80, 83 and 86, first estimated values Tcom1 corresponding to them may be 80, 83 and 86, respectively.

Since throttling may be entered when the first estimated value Tcom1 is 83, the throttling may be entered in a state in which the first temperature value Tread1 is 83 and the actual temperature value Tmem of the first memory 121 is 83. And also, the first power mode PM1 may be changed to the second power mode PM2 when the first estimated value Tcom1 is 83. Thus, various controls for reducing heat generation of the storage device 100 may be performed. When the first estimated value Tcom1 is 86, the cooling operation may be performed. Throttling may be entered when the actual temperature value Tmem of the first memory 121 is 83, and the cooling operation may be performed when the actual temperature value Tmem of the first memory 121 is 86. Therefore, in the second driving mode, heat generation control such as throttling or cooling may be performed even though the temperature of the first memory 121 is lower than in the first driving mode.

In the third driving mode that is the low-performance mode, when first temperature values Tread1 read from the first temperature sensor 141 are 77, 80 and 83, first estimated values Tcom1 corresponding to them may be 80, 83 and 86, respectively.

When the first estimated value Tcom1 is 83, the first temperature value Tread1 is 80 and the actual temperature value Tmem of the first memory 121 is 80. Since the first estimated value Tcom1 is equal to the threshold value for entering throttling, which is 83, throttling may be entered. In a state in which the first estimated value Tcom1 is 86, the first temperature value Tread1 is 83 and the actual temperature value Tmem of the first memory 121 is 83, and thus an additional operation for heat generation reduction such as the cooling operation may be performed because the first estimated value Tcom1 is equal to the threshold value for performing the cooling operation, which is 86. Throttling may be entered when the actual temperature value Tmem of the first memory 121 is 80, and the cooling operation may be performed when the actual temperature value Tmem of the first memory 121 is 83. Therefore, in the third driving mode, heat generation control such as throttling or cooling may be performed even when the temperature of the first memory 121 is lower than in the first driving mode and the second driving mode.

As such, since an estimated value is calculated and heat generation control is performed using a heat generation control equation set differently for each driving mode, the heat generation control of the storage device 100 may be performed without changing a threshold value that serves as a reference for the heat generation control. Since a threshold value used to control other operations than the heat generation control may be fixed, the heat generation control according to the driving mode may be easily performed without affecting control of the other operations.

In the embodiment of the disclosed technology, it is possible to control both heat generated by a memory and heat generated by various circuit components other than the memory included in the storage device 100.

Figure 8:
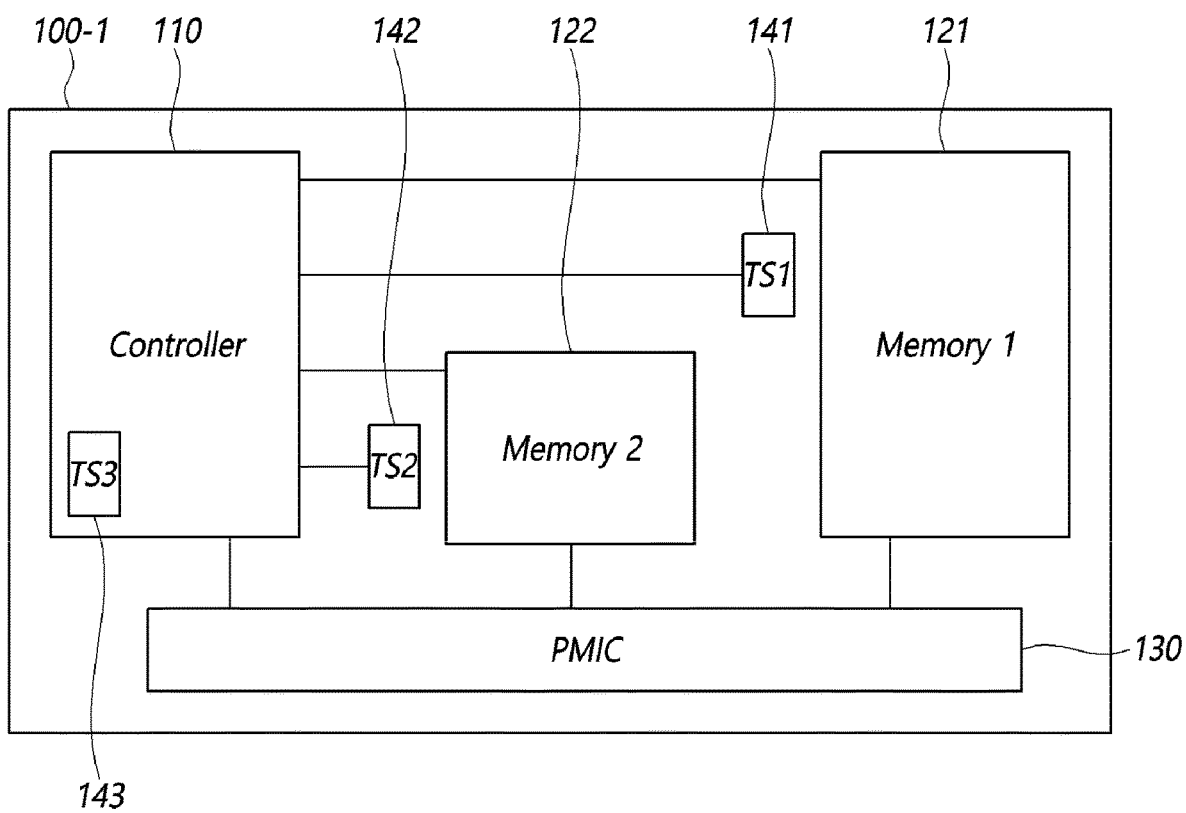
FIG. 8 illustrates a storage device according to another embodiment of the disclosed technology.
Figure 9:
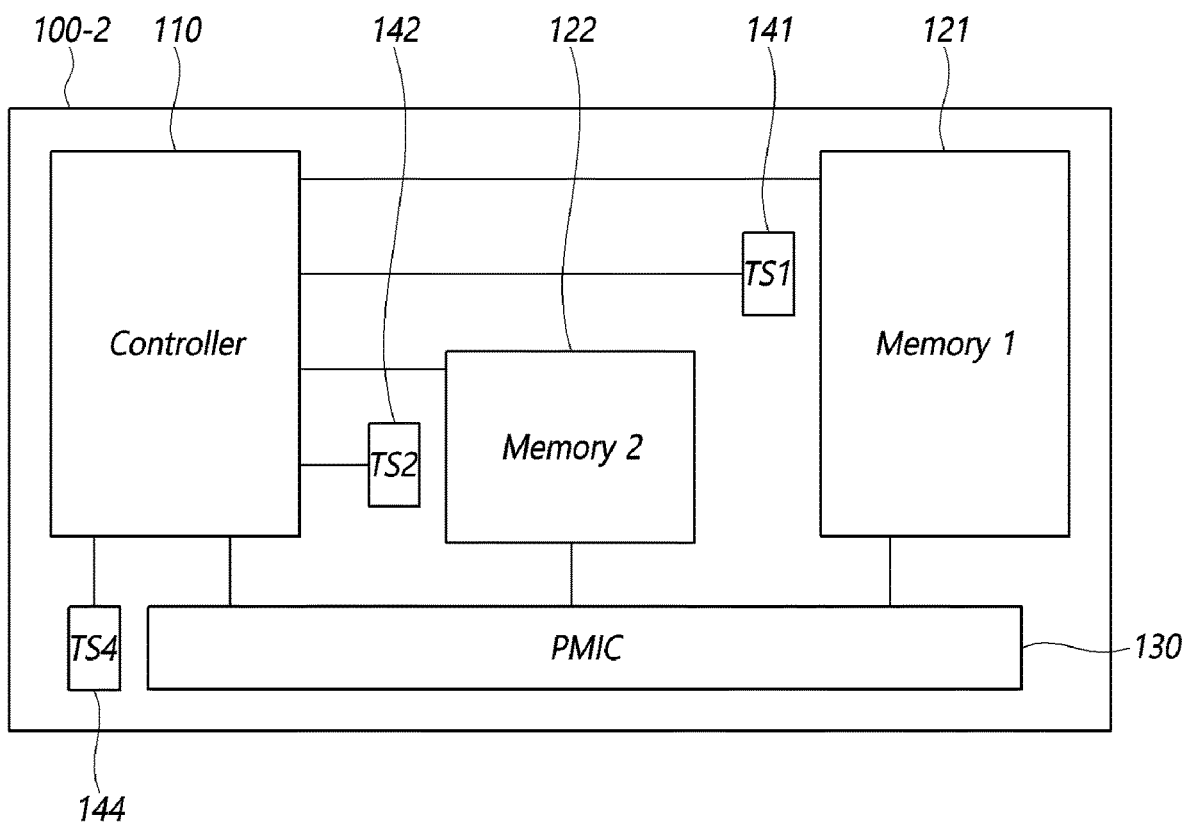
FIG. 9 illustrates a storage device according to still another embodiment of the disclosed technology.

FIGS. 8 and 9 each illustrate a storage device according to other embodiments of the disclosed technology. In FIGS. 8 and 9, descriptions overlapping with the content described above will be omitted.

Referring to FIG. 8, a storage device 100-1 may include a first memory 121, a second memory 122, a controller 110, and a power management integrated circuit 130, all of which are disposed on a substrate.

The storage device 100-1 may include a first temperature sensor (TS1) 141, which is disposed on the substrate and is positioned adjacent to the first memory 121. The storage device 100 may include a second temperature sensor (TS2) 142, which is disposed on the substrate and is positioned adjacent to the second memory 122.

The storage device 100 may further include a third temperature sensor (TS3) 143, which is positioned in the controller 110. In the present specification, the third temperature sensor 143 may be referred to as an "internal controller temperature sensor."

The controller 110 may perform heat generation control using a temperature value read from the first temperature sensor 141 or the second temperature sensor 142 and a preset heat generation control equation.

In addition, the controller 110 may perform the heat generation control using a temperature value read from the third temperature sensor 143 and a preset heat generation control equation. The heat generation control equation used for the heat generation control based on a temperature value read from the third temperature sensor 143 may be set differently for each power mode.

When the power mode is changed, a difference between a temperature value read from the third temperature sensor 143 and a threshold value may be changed. When the power mode is changed, a magnitude relationship between a temperature value read from the third temperature sensor 143 and a threshold value may be changed.

Since the controller 110 performs the heat generation control based on a temperature value obtained through the third temperature sensor 143 and uses a heat generation control equation set differently for each power mode, the heat generation control may be performed while preventing or reducing degradation in operational performance of the controller 110.

Furthermore, heat generation control for another circuit component other than the controller 110, which is included in the storage device 100, may also be performed differently according to each power mode.

For example, referring to FIG. 9, a storage device 100-2 may include a fourth temperature sensor (TS4) 144 in addition to a first temperature sensor 141 and a second temperature sensor 142.

The fourth temperature sensor 144 may be positioned adjacent to a power management integrated circuit 130. In the present specification, the fourth temperature sensor 144 may be referred to as an "external circuit temperature sensor."

The controller 110 may perform heat generation control for the power management integrated circuit 130 using a temperature value obtained from the fourth temperature sensor 144 and a preset heat generation control equation.

The heat generation control equation used for the controller 110 to perform the heat generation control for the power management integrated circuit 130 may be set differently for each power mode.

Since the controller 110 controls heat generation of the power management integrated circuit 130 using the heat generation control equation set differently for each power mode, the heat generation of the power management integrated circuit 130 may be controlled while reducing or minimizing degradation in performance of the power management integrated circuit 130 by changing the power mode according to heat generation control or entering of throttling.

As described above, a temperature sensor may be implemented for heat generation control in a memory or may be implemented for heat generation control in a circuit component. The temperature sensor may be disposed either inside or outside of each of the memory and the circuit component. The temperature sensor may be disposed for at least a part of components included in the storage device 100.

Also, the embodiment of the disclosed technology may be used to control heat generation of various electronic components in an electronic device in which the various electronic components are disposed on a substrate. In this case, temperature sensors may be disposed either inside or outside of the various electronic components, and a control module may perform heat generation control using temperature values obtained from the temperature sensors and heat generation control equations, which are set differently for each mode.

Figure 10:
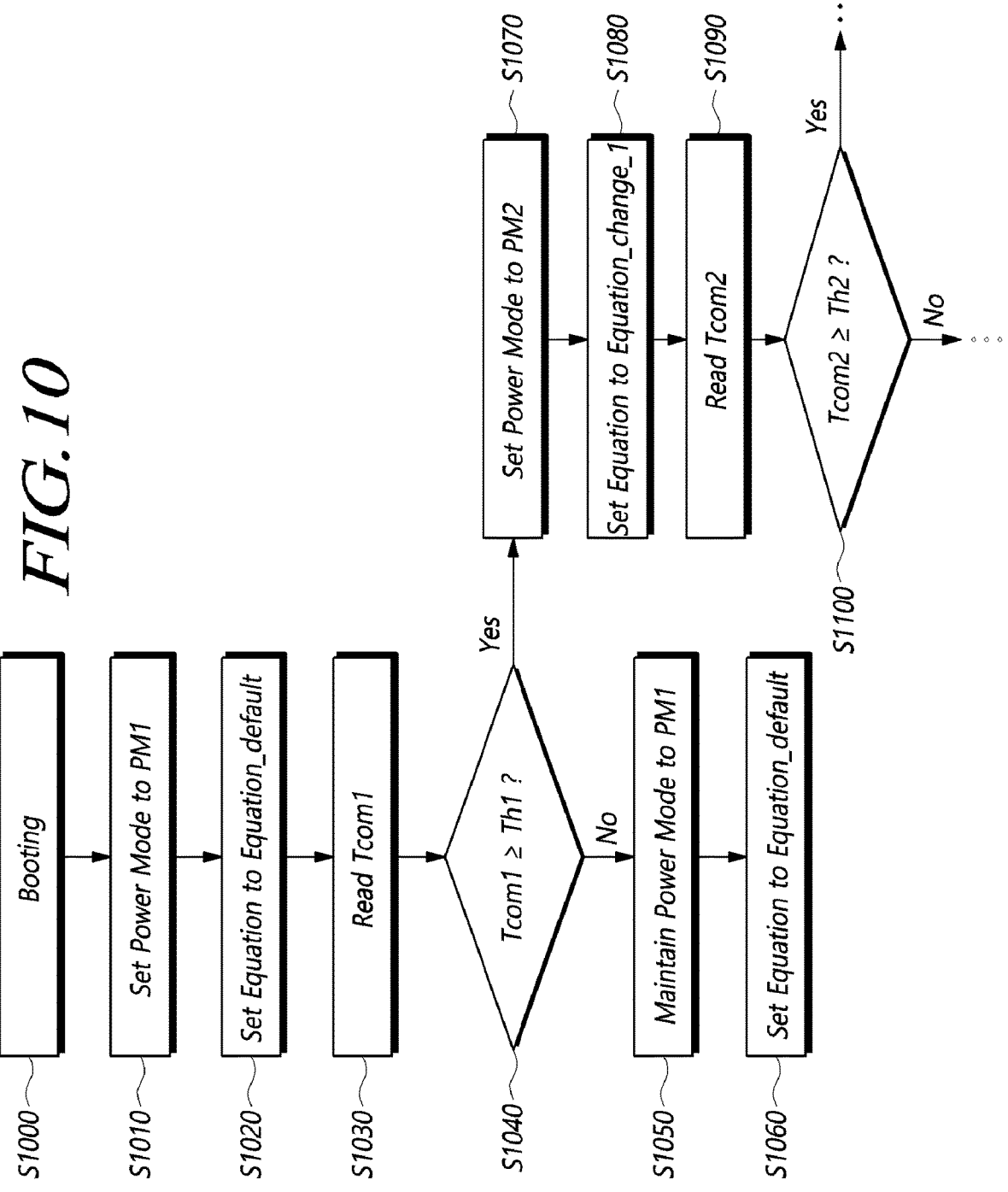
FIG. 10 illustrates a method in which a storage device performs heat generation control according to an embodiment of the disclosed technology.

FIG. 10 illustrates a method in which a storage device performs heat generation control according to an embodiment of the disclosed technology. The storage device may be the storage device 100 shown in FIG. 1. However, embodiments are not limited to the storage device 100.

Referring to FIG. 10, when the storage device 100 is booted (S1000), the controller 110 of the storage device 100 may set the power mode of the storage device 100 to a first power mode PM1 (S1010). The first power mode PM1 may be a default power mode, and it may be a mode in which operational performance of the storage device 100, or performance of a component such as a memory included in the storage device 100, does not degrade.

The controller 110 may set a heat generation control equation as a default heat generation control equation in the first power mode PM1 (S1020).

While operating in the first power mode PM1, the controller 110 may calculate a first estimated value Tcom1 using a temperature value read from a temperature sensor and the preset default heat generation control equation (S1030).

When the first estimated value Tcom1 is smaller than a preset threshold value Th1 (S1040), the controller 110 may maintain the power mode as the first power mode PM1 (S1050). Since the first power mode PM1 is maintained, the heat generation control equation may be set as the default heat generation control equation (S1060).

When the first estimated value Tcom1 is equal to or greater than the preset threshold value Th1 (S1040), the controller 110 may change the power mode to a second power mode PM2 (S1070).

The controller 110 may set the heat generation control equation to a first changed heat generation control equation in the second power mode PM2 (S1080). The first changed heat generation control equation may be different from the default heat generation control equation. When the storage device 100 operates in the second power mode PM2, the first changed heat generation control equation may be set to represent the relationship between a change in temperature of a component targeted for heat generation control, and a temperature value obtained by the temperature sensor.

While operating in the second power mode PM2, the controller 110 may calculate a second estimated value Tcom2 using the temperature value obtained through the temperature sensor and the first changed heat generation control equation.

The controller 110 may compare the second estimated value Tcom2 with a threshold value Th2 set for the second power mode PM2 (S1100). According to a comparison result between the second estimated value Tcom2 and the threshold value Th2, the controller 110 may maintain the second power mode PM2 or change the second power mode PM2 to another power mode.

As is apparent from the above description, in the embodiment of the disclosed technology, a heat generation control equation serving as a reference for changing the power mode or heat generation control is set differently for each power mode. Therefore, it is possible to perform the heat generation control that accurately reflects the relationship between a change in temperature of a component according to each power mode and a temperature value obtained by a temperature sensor.

By preventing damage or malfunction due to heat generation in a storage device, it is possible to prevent degradation in performance of the storage device due to a change in power mode or unnecessary entry into throttling according to a heat generation control operation. This results in improved operational performance of the storage device.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the disclosed technology as defined in the following claims.

What is claimed is:

1. A storage device comprising:
one or more memories;
one or more temperature sensors positioned adjacent to the one or more memories, respectively; and
a controller configured to determine a first estimated value using a first temperature value, which is obtained from the one or more temperature sensors while the one or more memories operate in a first power mode, and a default heat generation control equation, change the first power mode to a second power mode when the first estimated value is equal to or greater than a first threshold value, and perform heat generation control using a first changed heat generation control equation different from the default heat generation control equation while the one or more memories operate in the second power mode, wherein the controller is further configured to determine a second estimated value using a second temperature value, which is obtained from the one or more temperature sensors while the one or more memories operate in the second power mode, and the first changed heat generation control equation, and changes the second power mode to a third power mode when the second estimated value is equal to or greater than a second threshold value, and wherein a difference between the first temperature value and the first threshold value when the first power mode is changed to the second power mode is different from a difference between the second temperature value and the second threshold value when the second power mode is changed to the third power mode.

2. The storage device according to claim 1, wherein the controller performs the heat generation control using a second changed heat generation control equation different from the default heat generation control equation and the first changed heat generation control equation while the one or more memories operate in the third power mode.

3. The storage device according to claim 1, wherein the difference between the first temperature value and the first threshold value when the first power mode is changed to the second power mode is smaller than the difference between the second temperature value and the second threshold value when the second power mode is changed to the third power mode.

4. The storage device according to claim 1, wherein the first temperature value is greater than the first threshold value when the first power mode is changed to the second power mode, and the second temperature value is smaller than the second threshold value when the second power mode is changed to the third power mode.

5. The storage device according to claim 4, wherein an absolute value of the difference between the first temperature value and the first threshold value is greater than an absolute value of the difference between the second temperature value and the second threshold value.

6. The storage device according to claim 1, wherein the controller changes the second power mode to the first power mode when the second estimated value is smaller than the first threshold value.

7. The storage device according to claim 1, wherein the one or more memories include a first memory which is a nonvolatile memory and a second memory which is a volatile memory, the one or more temperature sensors include a first temperature sensor which is adjacent to the first memory and a second temperature sensor which is adjacent to the second memory, and a heat generation control equation applied to a temperature value obtained from the first temperature sensor and a heat generation control equation applied to a temperature value obtained from the second temperature sensor are set differently according to a power mode.

8. The storage device according to claim 1, further comprising:

a power management integrated circuit configured to supply power to the one or more memories and the controller; and an external circuit temperature sensor positioned adjacent to the power management integrated circuit, wherein a heat generation control equation applied to a temperature value obtained from the external circuit temperature sensor is set differently according to a power mode.

9. The storage device according to claim 1, further comprising:

an internal controller temperature sensor disposed in the controller, wherein a heat generation control equation applied to a temperature value obtained from the internal controller temperature sensor is set differently according to a power mode.

10. The storage device according to claim 1, wherein in the first power mode, the one or more memories operate in a first driving mode or a second driving mode, and in the first driving mode, the first estimated value is determined using a first default heat generation control equation, and in the second driving mode, the first estimated value is determined using a second default heat generation control equation that is different from the first default heat generation control equation.

11. The storage device according to claim 10, wherein the first estimated value determined in the first driving mode is smaller than the first temperature value, and the first estimated value determined in the second driving mode is equal to or greater than the first temperature value.

12. A storage device comprising:

one or more memories;

one or more temperature sensors positioned adjacent to the one or more memories, respectively; and a controller configured to control a power mode in which the one or more memories operate, based on a temperature value obtained from the one or more temperature sensors and a threshold value, wherein a difference between a first temperature value obtained from the one or more temperature sensors and a first threshold value when a first power mode is changed to a second power mode is smaller than a difference between a second temperature value obtained from the one or more temperature sensors and a second threshold value when the second power mode is changed to a third power mode.

13. The storage device according to claim 12, wherein power consumption set for the second power mode is smaller than power consumption set for the first power mode.

14. The storage device according to claim 12, wherein the first temperature value is greater than the first threshold value when the first power mode is changed to the second power mode, and the second temperature value is smaller than the second threshold value when the second power mode is changed to the third power mode.

15. An electronic device comprising:

a plurality of electronic components disposed on a substrate;

a plurality of temperature sensors disposed adjacent to the plurality of electronic components, respectively; and a controller configured to control a power mode in which at least a part of the plurality of electronic components operate, using temperature values, which are obtained from the plurality of temperature sensors, and heat generation control equations, the heat generation control equations being set differently for each power mode, wherein the controller changes a first temperature value obtained in a first power mode, by using a first heat generation control equation, and changes a second temperature value obtained in a second power mode, by using a second heat generation control equation, and a degree to which the first temperature value is changed by the first heat generation control equation is different from a degree to which the second temperature value is changed by the second heat generation control equation.

\* \* \* \* \*